(12) United States Patent
Boyles et al.

(10) Patent No.: US 6,934,841 B2
(45) Date of Patent: Aug. 23, 2005

(54) SMART CARD CONTROLLED INTERNET ACCESS

(75) Inventors: Stephen L. Boyles, Thomasville, NC (US); Richard C. Leinecker, Reidsville, NC (US); Jochen E. Fischer, Elon College, NC (US); Clyde G. Moody, Jr., Greensboro, NC (US); Troy McConnell, Greensboro, NC (US); Ken Wilkinson, Greensboro, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 43 days.

(21) Appl. No.: 10/790,940

(22) Filed: Mar. 1, 2004

(65) Prior Publication Data

US 2004/0172552 A1 Sep. 2, 2004

Related U.S. Application Data

(62) Division of application No. 09/461,958, filed on Dec. 15, 1999, now Pat. No. 6,738,901.

(51) Int. Cl.$^7$ ................................................ H04L 9/00
(52) U.S. Cl. ...................... 713/159; 713/161; 713/165; 713/168; 713/172
(58) Field of Search ................................. 713/159, 161, 713/165, 168, 172

(56) References Cited

U.S. PATENT DOCUMENTS

| | | |
|---|---|---|
| 3,609,690 A | 9/1971 | Nissman et al. |
| 4,532,416 A | 7/1985 | Berstein |
| 5,339,403 A | 8/1994 | Parker |
| 5,526,428 A | 6/1996 | Arnold |
| 5,602,918 A | 2/1997 | Chen et al. |
| 5,629,508 A | 5/1997 | Findley et al. |

(Continued)

OTHER PUBLICATIONS

RSA Algorithm Javascript Page, information from the internet, created Jun. 12, 1996.
Resolution on the use of internet filters, information from the Internet, copyright 1999.
How SSL Works, information from the Internet, copyright 1999.
"GuardiaNet the easiest fundraiser for your organization" GuardiaNet brochure, undated.
"Announcing a Special Offer to introduce your school to a safe fundraising program that offers protection for parents and free computers for your school", information sheet, undated.
"Now it's safe to let them out on their own", GuardiaNet brochure, undated.
"Now it's safe to let them go out on their own", information sheet from GuardiaNet, undated.
Information sheet on GuardiaNet that begins, "Dear Parents", undated.

(Continued)

Primary Examiner—Thomas R. Peeso
(74) Attorney, Agent, or Firm—Melissa E. Buss (57) ABSTRACT

A system for customizing individual internet access includes a server that registers a user with the system, stores information pertaining to internet sites the user is authorized to access, and controls the user's access to internet sites. A carding station is provided to enter personal identification information about the user and information regarding internet sites the user is authorized to access into the system. The carding station also generates a personal smart card for the user that includes a read only memory storing a serial number that correlates with data about the user stored in the server. An internet station is provided to allow the user to view the internet only with his or her personal smart card. While accessing the internet, the server controls the user's access to internet sites based on whether the information stored in the server indicates that the user is authorized to access the specific internet sites that are requested to be displayed. A secure sockets layer protocol provides security for the data transferred across the internet connection.

87 Claims, 5 Drawing Sheets

U.S. PATENT DOCUMENTS

| | | |
|---|---|---|
| 5,657,388 A | 8/1997 | Weiss |
| 5,678,041 A | 10/1997 | Baker et al. |
| 5,696,898 A | 12/1997 | Baker et al. |
| 5,706,507 A | 1/1998 | Schloss |
| 5,708,780 A | 1/1998 | Levergood et al. |
| 5,710,883 A | 1/1998 | Hong et al. |
| 5,721,827 A | 2/1998 | Logan et al. |
| 5,815,657 A | 9/1998 | Williams et al. |
| 5,835,712 A | 11/1998 | DuFresne |
| 5,864,683 A | 1/1999 | Boebert et al. |
| 5,889,958 A | 3/1999 | Willens |
| 5,933,600 A | 8/1999 | Shieh et al. |
| 5,933,827 A | 8/1999 | Cole et al. |
| 5,937,404 A | 8/1999 | Csaszar et al. |
| 5,941,947 A | 8/1999 | Brown et al. |
| 5,950,195 A | 9/1999 | Stockwell et al. |
| 5,953,732 A | 9/1999 | Meske, Jr. et al. |
| 5,983,176 A | 11/1999 | Hoffert et al. |
| 5,983,273 A | 11/1999 | White et al. |
| 5,991,810 A | 11/1999 | Shapiro et al. |
| 6,005,939 A | 12/1999 | Fortenberry et al. |
| 6,078,924 A | 6/2000 | Ainsbury et al. |
| 6,088,717 A | 7/2000 | Reed et al. |
| 6,154,775 A | 11/2000 | Coss et al. |
| 6,233,618 B1 | 5/2001 | Shannon |
| 6,738,901 B1 | 5/2004 | Boyles et al. |

OTHER PUBLICATIONS

Proprietary Material dated Aug. 21, 1997, 2:29 PM.

Proprietary Material dated Aug. 29, 1997, 1:34 PM.

Landmark Community Interests, LLC presents GuardiaNet information, undated.

SmartGuardian™ Client User Guide, Version 1.0, Apr. 1999.

SmartGuardian™ Carding User Guide, Version 1.0, Apr. 1999.

Information from Internet on Crypto API, Version 2.0, printed Dec. 3, 1999, 10 pages. http://msdn.microsoft.com.

Information from Internet entitled, "SmartGuardian™", printed Sep. 30, 1999, 3 pages. http://www.amazingtechnologies.com.

Article from Internet entitled, "The 'SmartCard' Internet Access Control System", City of Englewood, Colorado, USA, Englewood Library, 2 pages, http://www.ci.englewood.com.

Press Release from Internet entitled, "First smart card web-filtering system contract awarded to ASCT", Jan. 12, 1999, printed Sep. 30, 1999, 2 pages, http://www.amazingtechnologies.com.

SMART CARD CONTROLLED INTERNET ACCESS

RELATED APPLICATION

This patent application is a divisional of application Ser. No. 09/461,958, filed Dec. 15, 1999, now U.S. Pat. No. 6,738,901.

BACKGROUND OF THE INVENTION

The present invention relates generally to an improvement in filtering internet access. Building a one to one relationship on the internet can also be provided by this invention. In other words, rules other then filtering can be applied to the user. In particular, the present invention provides a system that recognizes and customizes individual internet access within a network.

The issue of varying levels of internet access arises in connection with public libraries. Public libraries are not immune to the $1^{st}$ Amendment of the United States Constitution. Adult patrons have the freedom to access and read whatever type of internet sites protected by the $1^{st}$ Amendment they choose. The present invention allows public libraries to offer a system that protects this freedom and still protects children from unsuitable internet sites, as selected by their parents. A server is provided (located on the internet) to register a user with the system and store information on whether the user is authorized to access certain internet sites. A carding station is provided to generate a personal smart card for the user. The smart card includes a read only memory. The smart card may be any ISO Standard Smart Card that stores a serial number that correlates with information about the user stored in the server. An internet station allows the user to view the internet only by inserting the personal smart card into a card reader and confirming that he/she is using his/her own card. In cooperation with the server, the internet station controls the user's access to the internet sites based on whether the data in the server indicates that the user is authorized to access the sites. The internet connection provided at the internet station is over public lines and data that is transferred to authenticate the user is secured by a secure sockets layer ("SSL") protocol.

While the internet provides virtually unlimited access to a wide variety of information and services (both protected by the $1^{st}$ amendment of the United States Constitution and unprotected due to federal, state and local laws), much of the information is unsuitable for certain age groups and is offensive to other groups or individuals. Therefore, public institutions, libraries and schools, are increasingly requiring an efficient and cost-effective infrastructure to administer and manage internet access according to the needs of different user groups. Some effort has been made to address this need by providing systems that restrict user access to particular internet sites. An example is shown in U.S. Pat. No. 5,937,404 to Csaszar et al.

While this system provides its patrons with access to only pre-approved internet sites and allows its patrons to search and review the approved sites with a reference card, it has the drawback of restricting the internet access of all of the patrons to a single set of approved sites that are stored on a server. For example, adults are only able to access the same set of approved sites that children are authorized to access. Further, adults that find certain internet sites offensive are unable to custom filter their internet access according to their interests. In order to provide customization of internet access, a plurality of servers must be provided and individual modules of software must be stored on different computers within the system.

Other types of internet filtering systems have been on the market, such as a system called GuardiaNet that was formerly sold by One Place, L.L.C., a predecessor of the assignee of the present application. The GuardiaNet system customized individual internet access by providing an encrypted "serial number" directly on the PC's hard disk drive and also had the ability to encrypt the serial number to a 3.5" standard Floppy Disk as well as to a personalized card with a microprocessor chip. Each card included a processor that stored information on internet sites the user was authorized to access. The user was able to access the internet only with his or her card and a server controlled the internet sites displayed during the user's session based on the information stored on the user's card. Even though the GuardiaNet system provided customized internet access, the system was not economical because the cards used in the system were too expensive. More specifically, the cost of each card was approximately $7.00 because each card included a microprocessor. Thus, the cost of distributing cards to all members of the public who may use a public library may quickly become prohibitive, as would the cost of replacing the card each time it was lost or stolen. Further, the GuardiaNet filtering software used a very complex security system to protect data transferred during each internet connection. The GuardiaNet filtering software encrypted data on an application level to establish secure communication pathways between a secured network and a user on a public, unsecured network. The security system established gateways or firewalls between the internet and any party desiring protection, and encrypted all data transmitted across the internet connection. This robust security system led to undesirably slow connection due to the fact that it was encrypting all data, graphic, and applications traversing the internet connection.

Accordingly, there is a need in the art for a faster and more economical system to customize individual or group internet access without having to separate computers for different types of users within the system.

SUMMARY OF THE INVENTION

The present invention fulfills this need in the art by providing a system that customizes individual internet access comprising an internet server that registers a user with the system, stores information regarding internet sites the user is authorized to access, and controls the user's access to the internet sites based on the information stored in the server for the specific user.

The system further includes a carding station that generates a personal smart card for the user and an internet stations that allows the user to view the internet with the personal smart card. The personal smart stores information that identifies the user to enable the server to control the user's access to the internet sites and does not include a microprocessor. However, the card could have a processor for other purposes and still be within the scope of this invention. The term "not including a microprocessor should be so construed.

The user is registered with the system by entry of personal identification information about the user at the carding station. The user is also registered with the system by entry of a personal identification number, password, fingerprint and/or other biometric data that provides security for the personal smart card. Further, the user is registered with the system by entry of the information regarding the internet sites the user is authorized to access. In addition, by utilizing the authentication method of a portable smart card associated to a trusted password communicating to the internet server, the system operates in an IP independent state. This is to say that the cardholder is able to gain his approved access from any computer employing the internet station software and card reader.

The server controls the users access to the internet sites by granting or denying requests from the internet station to display the internet sites, based on the information stored in the server regarding the internet sites the user is authorized to access. That information includes an access level selected from the group consisting of an unfiltered internet access level, a filtered internet access level, and a restricted internet access level. The unfiltered access level gives the user full access to all internet sites. The filtered internet access level blocks the user's access to one or more predetermined internet sites. The restricted internet access level blocks the user's access to any internet site that is not included in a predetermined set of approved internet sites. The predetermined internet sites for the filtered and restricted internet access levels may be chosen by the individual, or parent or guardian of the user that is using the system. In addition, some of the predetermined internet sites may be chosen by the system administrator. Further, some of the predetermined internet sites for the restricted internet access level may be chosen by a third party who has previewed the sites and determined them to be generally safe for all ages, truthful, and including valuable and authentic information. The server also controls the user's access to specific internet sites by reviewing a requested internet site and blocking the site if it contains selected material.

The personal smart card includes a read only memory that stores the information that identifies the user. The read only memory on the personal smart card is configured as a storage area selected from the group consisting of an encoded memory chip, a, a bar code, and machine readable indicia. The information that identifies the user is unique to that personal smart card and differentiates it from similar personal smart cards.

The carding station preferably includes a digital camera for taking a photograph of the user and card production software to print the photograph of the user on the personal smart card. The carding station also includes a card printer for printing the personal smart card. Once the card has been produced, the information on the smart card is associated with the user's name, geographical information, personal password etc. and is stored on the system server located on the internet as distinct from local servers/PCs.

The internet station includes a data display unit selected from the group consisting of a computer terminal, a telephone, a pager, a television, and a personal digital assistant, the internet station also includes a card reader for reading the personal smart card. The user is able to view the internet from the internet station by insertion of the personal smart card into the card reader and authentication that the user is using his/her own personal smart card. The personal smart card may be authenticated by entry of a personal identification number or password that is associated with the personal smart card. The personal smart card also may be authenticated by verification of a fingerprint of the user.

The internet station can use any "standard to the internet browser" such as Microsoft's Internet Explorer v.5.x and Netscape Navigator v.4.x. A predetermined "homepage" is set in the browser in the normal manner. The software in the internet station may be may be programmed to allow the viewing of certain "authentication not present" internet pages that are associated with the facility providing the public access. This is to insure that in the public, citizens have the ability to view and respond to information about their local area without having to register for usage. When this "local domain" is left, such as, by selection of another Domain or Universal Resource Locator (URL), the user will be prompted that "a smart card is required". On insertion of the user's smart card, the user is prompted for a "password". If the smart card and password matches, the user is then granted access to the Internet in accordance with the access rules that have been registered in association with the user. When the user has finished with browsing the internet and the smart card is removed from the reader, the software shuts down the browser, reopens the browser and resets to display the facility's homepage.

The server may also include information regarding the a maximum amount of time the user may view the internet during a time interval e.g. 4 hours out of 24, resetting to the user's registered maximum daily access time at midnight. The server may also store a maximum number of pages the user may print during a time interval. The server may also include information on an amount of money that is credited to the user's account. In addition, the server may include one or more bookmarks to internet sites that are selected by the user.

The system further includes a secure sockets layer protocol that provides security for data transferred across an internet connection. Preferably, the secure sockets layer protocol includes Microsoft's CrptoAPI®. The secure sockets layer protocol enables the carding station to encrypt the data and use hypertext transfer protocol to communicate with the server.

The present invention further provides a carding station that communicates information about the user to the internet server such as the user's name, personal password, access rules, and other information that the facility wishes to associate with the user. This station associates this information with a serial number that is encoded to a memory area of the smart card. As a part of the registration process, this information creates a user defined "account" in the internet database securely located on the internet server. The carding station produces, by means of dye sublimation, printing the user's smart card from blank white smart card stock as supplied from any number of vendors. The personalization station has the ability to format the necessary data to fully print the card including but not limited to the portrait, name, other identifying textural information, and the basic identifying indicia of the facility issuing the smart card. Furthermore, after the automatic creation of this user database account, an administrator of the facility has the ability to securely retrieve this data on the internet by authenticating him/herself as an administrator to the facility associated with the user. Once this administrator authentication has taken place, the administrator has the ability to further define the information, make updates, look up passwords, or delete the account as needed. The user is associated as an individual with sole rights to certain amounts of internet content or as a part of a predefined group of users all having the same basic access rights. It is possible to associate an individual to a group of individuals and to also give individuals in this group slightly different access rights to access or deny certain areas of internet content. In other words, it is possible to "base assign" an individual to a group and to add or delete internet sites for the one individual from that base list. It is also possible to register an individual as an administrator of a smaller group with each person in the group having different access rights, all managed by the administrator.

The present invention further provides a method of customizing individual internet access in a system comprising the acts of registration of a user with the system by entry of information about the user at a carding station, storing in a server information on whether the user is authorized to access specific internet sites, generating a personal smart card for the user at a carding station, the personal smart card including information that uniquely identifies the user and not including a microprocessor, reading the personal smart card at an internet station, identifying the user based on the information stored on the personal smart card, controlling the user's access to the specific internet sites based on the information stored in the server regarding whether the user is authorized to access the specific internet sites, and displaying the internet at the internet station.

The personal smart card of the present invention preferably includes a photograph of the user of the system and a read only memory that stores information identifying the user to enable the system to control the user's internet access. The personal smart card could include a microprocessor depending on other actions the facility would like to associate with the smart card, as noted above.

In a preferred embodiment, the server of the present invention includes a registration module that registers a user with the system, a database that stores information regarding a first set of internet sites the user is authorized to access, an administration module that executes an active server page when an internet site is requested to be displayed, and a deny module that grants or denies a request to display an internet site based on the information stored in the database regarding the first set of internet sites the user is authorized to access.

Preferably, the carding station includes a registration module that enables entry of information about a user into the system to register the user with the system and has a data transfer capability for transfer of entered user information between the carding station and a internet or local server. The carding station also includes a camera that takes a photograph of the user, and a card printer that generates a personal smart card not including a microprocessor for the user, the personal smart card including information that identifies the user correlated with the entered user information transferred to a server.

In a preferred embodiment, the internet station includes a card reader that reads a read only memory, and not a microprocessor, on a personal smart card issued to a user to obtain information that identifies the user to control the user's internet access. The internet station also includes an authentication module that verifies that the user is using his/her own personal smart card, an internet browser that allows the user to search the internet, a shim that communicates with the internet browser and has a port for connection to a server to request permission from the server to display an internet site requested by the user, and a WSOCK that communicates with the shim and displays the internet site requested by the user if permission is granted by the server.

BRIEF DESCRIPTION OF THE DRAWINGS

The present invention will be better understood by a reading of the Detailed Description of the Preferred Embodiments along with a review of the drawings, in which.

DETAILED DESCRIPTION OF THE PREFERRED EMBODIMENT

In the following description, like reference characters designate like or corresponding parts throughout the several figures. The illustrations are provided for the purpose of describing preferred embodiments of the invention and are not intended to limit the invention thereto.

Figure 1:
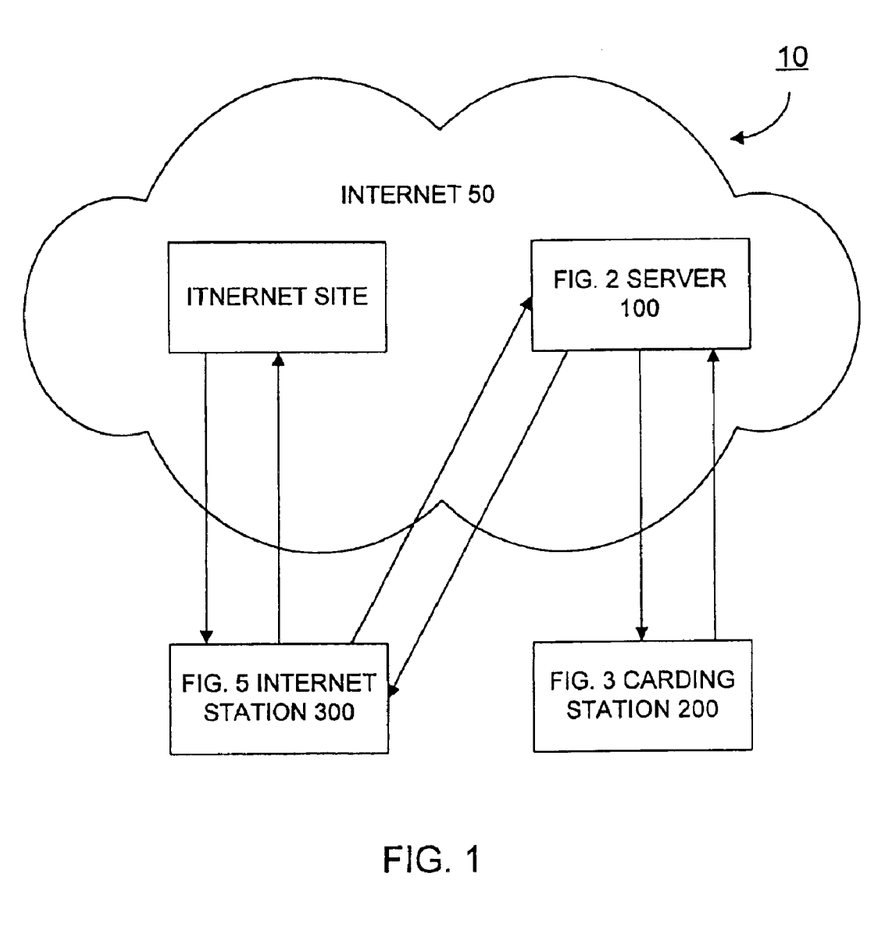
FIG. 1 is a schematic diagram of a smart card controlled internet access system according to the invention.

As seen in FIG. 1, the preferred embodiment of the present invention provides a smart card controlled internet access system 10 having a server 100, a carding station 200, and an internet station 300. The server 100 registers users with the system 10 and controls the users' access to the internet 50 from the internet station 300. The server 100 may include information on internet sites each user is authorized to access. The carding station 200 generates a personal smart card 250 (shown in FIG. 4) for each user of the system. The card 250 includes a read only memory that stores a serial number that correlates with information about the user stored in the server. During the card issuing process, the carding station 200 requests the server 100 to register the user with the system 10 upon entry of identification information about the user.

Once the registration process is complete and the personal smart card 250 is issued to the user, the user may use the card to access the internet 50 from the internet station 300. When the internet station 300 reads the information on the personal smart card 250, the internet station 300 sends a request to the server 100 to log the user on to the system 10. Once the user is logged on to the system 10, he or she may initiate browsing the internet 50 by typing in a uniform resource locator ("URL") or clicking on a word or icon forming a hyper link to a URL. The internet station 300 then automatically requests permission from the server 100 to display the selected internet site. The server 100 either grants or denies permission to display the site based on the information stored in the server 100 regarding the user's authorization to access particular internet sites. If permission is granted, the server 100 sends a request to the server on the internet 50 to display the site. If access is denied, an error message is generated at the internet station 300.

Figure 2:
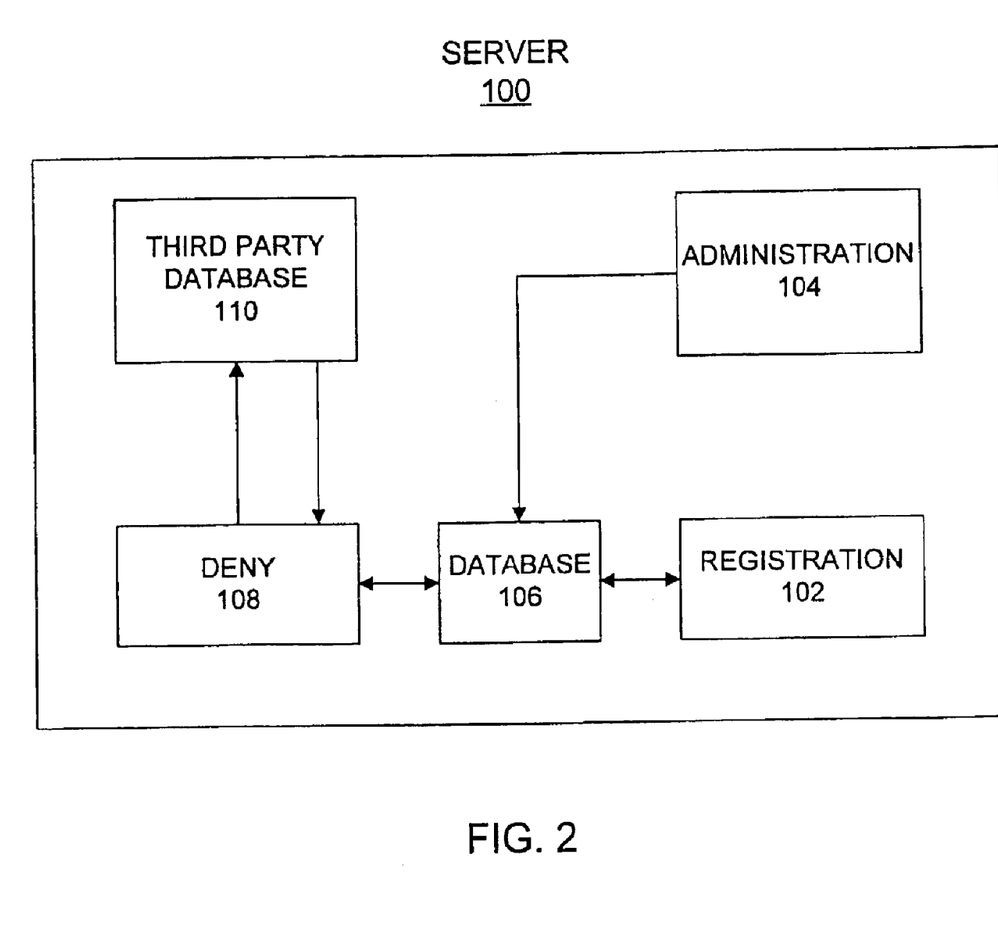
FIG. 2 is schematic diagram of a server in the smart card controlled internet access system of FIG. 1.

As seen in FIG. 2, the preferred embodiment of the present invention provides the server 100 having a registration module 102. The registration module 102 accesses a database 106 to register users with the server 100 upon request from the carding station 200. The registration module 102 also accesses the database 106 to verify that the user is using his or her own personal smart card 250 when requesting to browse the internet from the internet station 300. The database 106 is made up of individual tables that hold specific data in each one. Such data may include information about the system's users such as personal identification information, demographic data, session data, and access rules defining each user's access to particular internet sites. The access rules may be positive or negative. That is, the rules can be to permit access only to specific, pre-approved sites. Or, the rules may be to permit access unless the site is on a forbidden list. The rules may further permit access as long as certain words do not appear on the internet site. A third party database 110 may also be accessed (either on the server 100 or remotely by a separate internet connection) that includes lists of sites for positive or negative rule applications. For example, the third party database 110 may include filtering software that is known in the art such as Kid's Click™ and Awesome Library™, both of which provide thousands of pre-selected internet sites that are considered to be safe for children. Alternatively, global lists of internet sites chosen by third parties may be directly incorporated into the system database 106. Other selection rules can be available for use as desired.

The server 100 also includes an administration module 104, which includes a collection of active server pages running on the server 100 and a set of stored procedures running in the database 106. To the user, the active server pages appear to be a set of internet sites that allow the user to enter new data or modify or delete existing data. Each time an internet site is requested to be displayed, an active server page is executed on the server 100 to process the request and dynamically create the requested internet page. The active server pages include a mixture of Hypertext Markup Language ("HTML") and Visual Basic scripting code to access the database 106 and other functions of the server 100. The Visual Basic scripting code is software code that is being interpreted at runtime by the server 100. The outcome of the software interpretation is merged with HTML code to make up a full internet page that is sent back to the internet station 300. Most of the active server pages contain information housed in the database 106 such as user identification information and access rules for the user. Thus, the active server pages generally interact with the database 106 to check user authentication, for example.

A deny module 108 is provided to grant or deny permission requests from the internet station 300 to display particular internet sites. The deny module 108 makes its decision based on application of the access rules pertinent for the user identified by the personal smart card 250 and the appropriate interplay of data from database 106 or 110, or such other information as may be needed for application of the access rule. Thus, the filtering software provided in the server 100 of present invention links internet filtering to the specific user via a personal smart card, and not by linking internet filtering to a personal computer.

Figure 3:
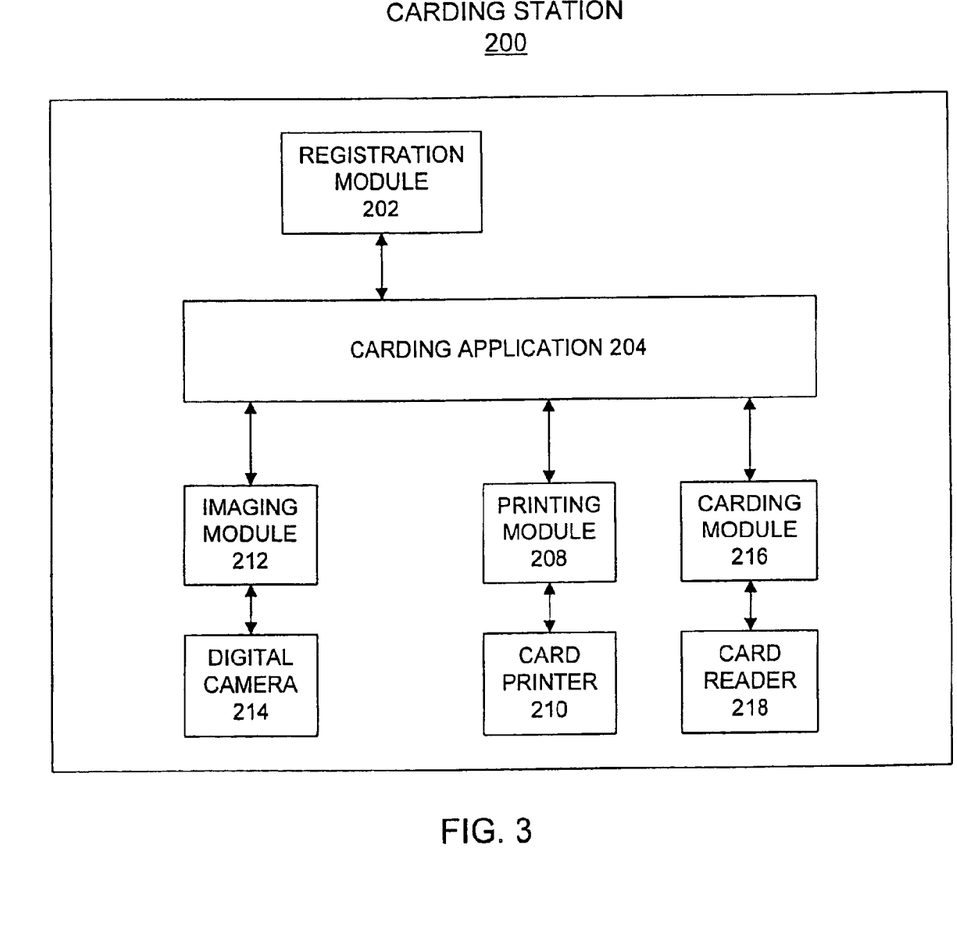
FIG. 3 is a schematic diagram of a carding station in the smart controlled internet access system of FIG. 1.

As seen in FIG. 3, a registration module 202 is provided in the carding station 200 to register a user with the system 10. The registration module 202 is executed by a carding application 204 that allows a system administrator to enter information about the user into the system 10. More specifically, a software program, such as Visual Basic, provides data entry screens to prompt the system administrator (or the user) to enter the information about the user. The information may include the user's first name, last name, residence address, mailing address, home phone number, work phone number and birth date. The information may also include the names of a child's parents or guardians. Other pertinent data may also be included. The data entry screens also prompt the system administrator to allow the user to choose and enter a password or a personal identification number ("PIN") into the system 10 during the registration process. This password or PIN is not stored on the card, but it is encrypted and sent to the registration module 102 of the server 100. There, it is decrypted and stored along with a serial number permanently stored on the card. Thus, the server 100 includes a database built up of PIN numbers, personal information and serial numbers. The password or PIN may be used to secure the personal smart card 250. Alternatively, the data entry screens may prompt the system administrator to scan a fingerprint or other biometric information about the user into the system 10 for storage in the server 100 to provide security for the personal smart card 250.

At the time of registration, a scan of the smart cards' associated owner's finger would be recorded into fingerprint software located on the remote internet server. The current state of the art technology uses solid-state capacitance sensing (as opposed to optical scanning) to capture unique fingerprint data. This CMOS based silicon technology has the ability to rapidly scan a finger, convert the digital data to an analog signal less than 300 k and transmit to processing software on the server. This software preferably reduces noise in the image, convert the image to digital form, and extracts a set of characteristics unique to that fingerprint (minutia). The minutia data of the individual would be entered into a relational data entry associating it to the serial number of the smart card in the same manner as the association of PIN and Card. There are several licensable packages and modules from Lucent, Veridicom, Biometric Systems Lab, Cesena to name a few. The client sensors are about the size of a postage stamp and would be connected to the client PC. To preserve privacy in the Library, these systems can be programmed to not transmit entire fingerprints but just enough minutia data to satisfy the proper ownership to the smart card. Thus, there would not be enough data to be searched by law enforcement to know who is registered at the library. This is an important factor for civil liberties protection.

Also during the registration process at the carding station 200, the system administrator is prompted to enter information into the data entry screens regarding the access rules for internet sites the user is authorized to access. For example, an adult may choose to have full access to the internet without any filtering or restrictions. This level of internet access may be designated as "unfiltered internet access". However, "unfiltered internet access" should be construed to include the possibility that a facility has the ability to deny any internet content that is deemed illegal (not protected by the $1^{st}$ Amendment of the U.S. Constitution) in the community where the access is granted.

Some adults or some parents may choose to have "filtered internet access" for themselves or for their children. More specifically, this level of internet access may be filtered to eliminate the majority of obscene, hate related, or pornographic internet sites by providing access to all sites not removed by the filter. The user, parent, or guardian and system administrator may work together to determine which specific internet site access rules are inappropriate for the user. Further, a global list of internet sites deemed inappropriate for certain users by a third party may be included in the filtered internet access level. This access level raises the risk that some objectionable sites may be accessed because they were not on the excluded list or did not have some specific key on which filter program is based.

A "restricted internet access" level, which is suited for children, may provide limited internet access to pre-selected internet sites that have been previewed and determined to be safe for children and young adults. In this internet access level, children and young adults are able to safely search a wide variety of designated subject areas, but are unable to venture out to other non-previewed internet sites. Thus, in "restricted internet access" no site is accessible unless it is on the pre-selected list. The internet sites on the pre-selected list may be chosen by the user, the parent or guardian of the user, the system administrator, or a third party. This internet access level raises the risk that the user will be excluded from non-objectionable sites because those sites did not get included on the pre-selected list. The software that provides these different levels of internet access may be stored in the server 100, as discussed above. Each access level has strengths and weaknesses, and the invention allows a parent, when registering a child for internet access to make the choice he or she thinks most suitable. The server 100, having identified a user of the internet station 300 operating in conformance with these rules, permits the internet station 300 to access only sites that comply with the access rules. In addition, a facility may have the ability to include many different offerings, as needed. For example, in a school environment, a different filtering level may be associated with different ages or grade levels.

Other supplementary information may also be entered into the system 10 during the registration process. For example, the system administrator may enter information regarding the maximum amount of time the user may view the internet during a predetermined time interval. This feature is especially useful in school and library settings where there are potentially many users and only a limited number of internet stations 300. The system administrator may also enter information regarding the maximum number of pages a user may print from a printer connected to the system during a predetermined time. In addition, a cash value allocated to the user and stored in the server may be decremented as the user incurs expense such as for making copies, accessing internet sites that charge for access or making purchases on the internet. Cash addition stations (not shown) may also be provided to increment the values stored in the server 100 for a particular user.

Once the system administrator has completed entering the above-described information about the user into the system 10, the system administrator requests the server 100 to register the user. During the registration process, the server 100 is updated to contain all user parameters, and can be modified by the system administrator (having a high level access code) at any time from any internet access terminal. The server 100 responds to the request to register from the carding station 100 by authorizing or denying creation of the personal smart card 250.

The carding application module 204 also executes an imaging module 212 and a printing module 208 to process information needed to create the personal smart card 250. The system administrator takes a digital photograph of the user with a digital camera 214. The photograph may be retaken as many times as needed to get an acceptable photograph. The imaging module 212 is provided with software to process the selected photograph and allow the user or system administrator alter the photograph, typically limited to cropping scaling and centering in the frame the photograph as needed. The printing module 208 then processes the information necessary to print the personal smart card 250 with a card printer 210. The printed information typically includes the user's name and photograph. Printing the photograph provides and extra security measure, because an unauthorized user of the card will not match the printed photograph. Also, users are less likely to lose or discard cards bearing their photograph. The card printer 210 may be a Dai Nippon card printer, which is known in the art.

The carding station 200 also includes a card reader 216 that reads information stored on the personal smart card 250 and a carding module 218 that processes the information read off the card 250 and enables the system 10 to reprogram the card 250. For example, a child whose smart card 250 indicia correlates with data in the server 100 indicating restricted internet access may choose to have his/her card reprogrammed when he/she reaches adulthood so that the indicia correlates with filtered or unrestricted internet access.

Figure 4:
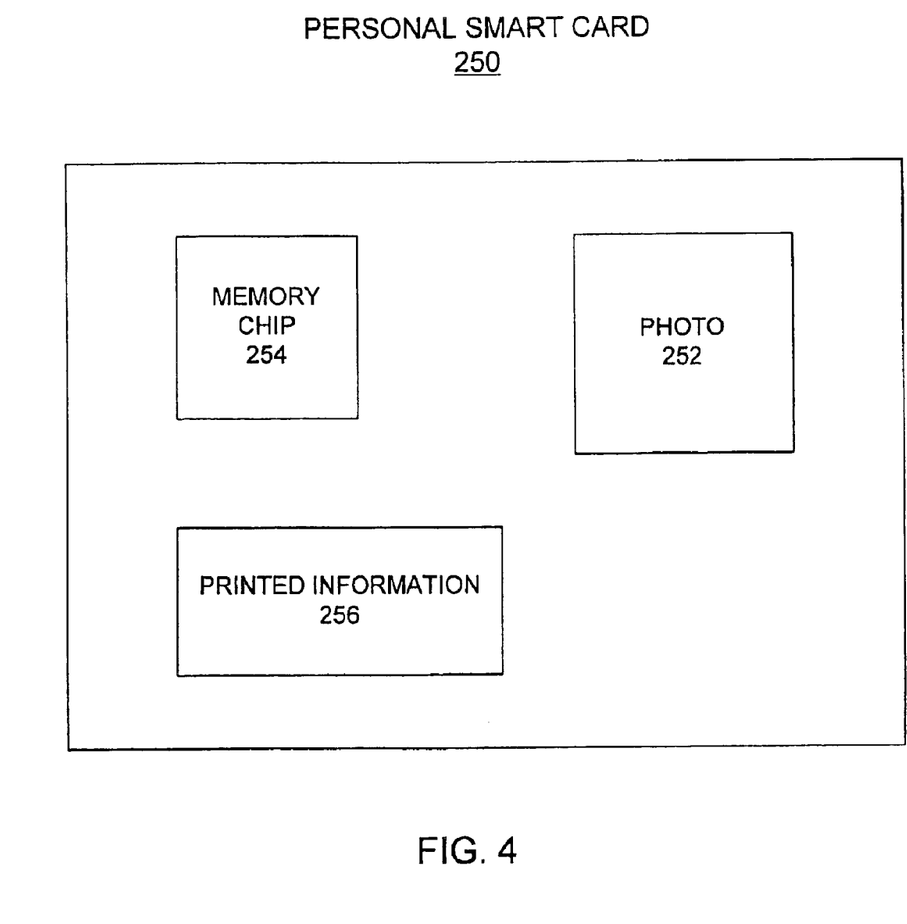
FIG. 4 is a perspective view of a personal smart card according to the invention.

As seen in FIG. 4, the personal smart card 250 is generally wallet sized and may be formed of a hard plastic, similar to the plastic used in making credit cards, drivers' licenses and the like. The smart card 250 may include the digital photograph 252 of the user and additional information such as the name of the user or the name of the school or library in which the card will be used.

The personal smart card 250 also includes an encoded memory chip 254. The encoded chip is a read only memory device that stores a unique serial number typically pre-encoded rather than information about the user. At the end of the registration process, that number is read from the card and is transmitted to the server where it is stored correlated with the password or PIN number and the data associated with the user. Then, when the user inserts his or her card 250 in a card reader 302 at the internet station 300 and enters his or her password or PIN number, this information can be encrypted and transmitted to the server 100. The server 100 thus has a secure identification of who the user is at the internet station 300 and can apply the applicable rules stored at the server 100. The use of a card that has minimal information stored on it minimizes cost. In alternative embodiments, the personal smart card 250 may include a magnetic stripe, a bar code or other storage devices to store the unique number.

In another embodiment of the present invention, the carding station 300 transmits the information entered at the carding station 300 to a remote service bureau that processes the information and generates the personal smart card 250. For example, a system administrator enters all of the information necessary to register the user with the system at the carding station, as described above. The system administrator also takes the digital photograph of the user during registration. The system 10 then transmits this information to the remote service bureau where the information is used to print the personal smart card 250 for the user. The card 250 may then be mailed to the registered user. This embodiment of the present invention may be especially efficient if the service bureau is equipped to generate mass quantities of personal smart cards 250. Further, this embodiment may be more economical for an entity that does not want to pay for card materials, the card printer 210, and maintenance costs.

Figure 5:
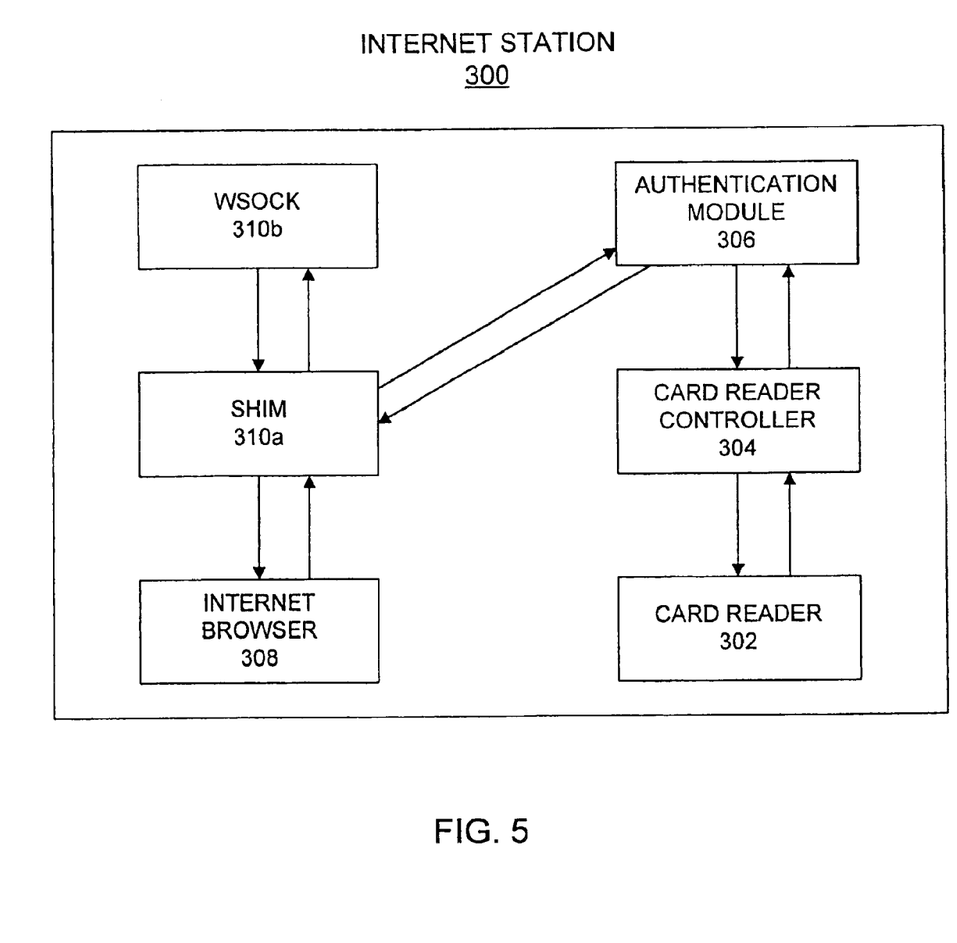
FIG. 5 is a schematic diagram of an internet station in the smart card controlled internet access system of FIG. 1.

As seen in FIG. 5, the internet station 300 is provided to allow users to view the internet 50. While personal computer are most commonly used to display the internet 50, any data display unit that is suitable for displaying the internet 50 is not outside the scope of the present invention. Such data display units may include telephones, pagers, televisions, and personal digital assistants.

The user is able to view the internet 50 from the internet station 300 only by inserting his or her personal smart card 250 into a card reader 302 and entering his or her PIN or password at the browser 308. A card reader controller 304 is provided with software to process the information read by the card reader 302. The internet station 300 then utilizes an authentication module 306 to communicate with the registration module 102 and verify that the user is using his or her own personal smart card 250. This process may be performed by comparing the PIN or password entered by the user with the PIN or password that is associated with the personal smart card 250. Alternatively, the authentication module 306 may communicate with the registration module 102 to authenticate the personal smart card 250 by comparing the fingerprint or other biometric data of the user with the scanned fingerprint or other biometric data associated with the personal smart card 250.

Once the authentication module 306 receives verification from the server 100 that the user is using his or her own personal smart card 250, the internet station 300 requests the server 100 to log the user on to the system 10. If, for example, the server 100 determines that the user has exceeded his or her allotted time to view the internet 50 during a predetermined time, the server will deny the internet station's 300 request to log the user onto the system 10 and generate an error message.

An internet browser 308 such as Microsoft Internet Explorer™, Netscape Navigator™, or other internet browsers, may be loaded onto the data display unit at the internet station 300 to provide an interface for the user to access the internet 50. When the user requests to browse the internet 50, the internet browser 308 sends a request to a shim 310*a*. The shim 310*a* then sends a permission request to the internet server 100 to determine whether the user is authorized to access that particular internet site.

Depending on the information about the user stored on the server 100, the server 100 determines whether the user is authorized to access that internet site and sends a response back to the internet station 300. For example, the server 100 may first evaluate the predetermined internet sites that have been set up for that specific user to determine whether to grant access to a specific internet site. If a decision cannot be made on that basis, the server 100 may next evaluate the predetermined internet sites that have been set up for a specific group of users, such as all library users or users under age 10. If a decision still cannot be made, the server 100 may evaluate the global lists of internet sites preselected by third parties to determine whether or not permission should be granted. If permission is granted, the shim 310*a* passes the hypertext transfer protocol ("HTTP") request to the operating system's WSOCK32 310*b* internet interface module, which requests the internet server to transmit the files for the internet site. Use of the shim 310*a* allows the system 10 to intercept all traffic between the internet browser 308 and the WSOCK 310*b* to determine whether the access is authorized.

Whenever the personal smart card 250 is removed from the card reader 302, the internet browser 308 automatically shuts down and opens up a fresh copy of the browser 308 to keep onlookers from viewing the last displayed internet site. Also the history of that user's session is erased from the browser 308 and the registration module 102 is notified that the user's session has ended. This could be achieved by the system administrator turning off the cache on the internet browsers.

In a further embodiment, the data stored at the server 100 for the user may include one or more bookmarks to the user's favorite or most frequently visited internet sites. Thus, when a user inserts his or her personal smart card 250 into the card reader 302 at the internet station 300 and accesses the internet 50, he or she will have easy access to his or her list of favorite internet sites.

In a further embodiment of the present invention, a security measure is provided to protect data transferred over the internet connection provided by the system, while still providing a relatively fast internet connection. More specifically, the present invention employs a secure sockets layer ("SSL") security system which enables a faster internet connection than the security system employed by other known internet filtering systems. In these previous systems, all data transferred during the internet connection was encrypted on the internet protocol level. Thus, the systems used the TCP/IP stack not knowing that the channel underneath was already encrypted. This led to an undesirably slow internet connection. Rather than talking behind a secure gateway or firewall in the server and encrypting all internet traffic, the present invention uses a software program such as Microsoft CryptoAPI® to encrypt data on an application level. In particular, the internet station 300 of the present invention directly encrypts data and uses HTTP to transfer the data to the server 100, rather than the TCP/IP. The HTTP is a protocol that runs on top of TCP/IP. Thus, the present invention encrypts only sensitive data such as the user's password, PIN, or other biometric data that is transferred during the authentication process to ensure that the user is using his/her own personal smart card 250. Further, data such as the user's credit card number may be encrypted so that it does not get intercepted by a third party. The system 10 then uses RSA public key cryptography to verify the identity of the user and establish a secure internet connection. Once the secure connection is established, data is freely transmitted without being encrypted. Therefore, the security measure provided in the present invention provides a secure internet connection without slowing down the internet connection by encrypting all internet traffic.

Based on the foregoing, the present invention provides an economical and fast system that customizes individual internet access without the need for filtering an entire computer networking system. The system includes a server that registers a user with the system and controls the users access to specific internet sites. During the registration process, information is entered into the server regarding internet sites the user is authorized to access. A carding station is provided to generate a personal smart card for the user upon registration. The personal smart card includes a read only memory that stores a serial number that correlates with the data about the user stored in the server. An internet station is provided to allow the user to view the internet with his or her personal smart card.

Because each individual user of the system is issued his or her own personal smart card and the server 100 can identify rules for access to internet sites that he or she is authorized to access, it is unnecessary to filter the entire computer network system and limit all of the users access to the same internet sites. Further, because the personal smart card includes a read only memory, rather than a microprocessor, each card is relatively inexpensive. In addition, the secure sockets layer protocol that protects data transferred during the internet connection provides a faster internet connection than the security measure employed by known internet filtering systems. Therefore, an advantage of the present system is that it provides inexpensive, fast, and fully configurable individual internet access and integrates into an existing infrastructure. Further, there is no need to separate computers for different types of users and user groups.

Certain modifications and improvements will occur to those skilled in the art upon reading the foregoing description. For example, as mentioned above, the internet station may include any type of data display unit that is suitable for displaying the internet. Further, any type of filtering software may be used in the server to provide different levels of internet access or different types of custom profiles for internet access. It should be understood that all such modifications and improvements have been omitted for the state of conciseness and readability, but are properly within the scope of the following claims.

What is claimed is:

1. A method of customizing individual internet access in a system comprising the following acts:

registration of a user with the system by entry of information about the user at a carding station;

storing in a server information on whether the user is authorized to access specific internet sites;

generating a personal smart card for the user at a carding station, the personal smart card including information that uniquely identifies the user and not including a microprocessor;

reading the personal smart card at an internet station;

identifying the user based on the information stored on the personal smart card;

controlling the user's access to the specific internet sites based on the information stored in the server regarding whether the user is authorized to access the specific internet sites; and displaying the internet at the internet station.

2. The method of customizing individual internet access in a system as defined in claim 1 wherein registration includes entering personal identification information about the user at the carding station.

3. The method of customizing individual internet access as defined in claim 1 wherein registration includes entering a personal identification number at the carding station, the personal identification number providing security for the personal smart card.

4. The method of customizing individual internet access as defined in claim 1 wherein registration includes entering a password at the carding station, the password providing security for the personal smart card.

5. The method of customizing individual internet access as defined in claim 1 wherein registration includes scanning a fingerprint or other biometric data of the user, the fingerprint or other biometric data providing security for the personal smart card.

6. The method of customizing individual internet access in a system as defined in claim 1 wherein registration includes entering the information on whether the user is authorized to access the specific internet sites at the carding station.

7. The method of customizing individual internet access in a system as defined in claim 1 wherein said controlling act is performed by a server.

8. The method of customizing individual internet access in a system as defined in claim 1 wherein said controlling act includes granting or denying requests from the internet station to display the specific internet sites based on the information stored in said server regarding whether the user is authorized to access the specific internet sites.

9. The method of customizing individual internet access in a system as defined in claim 1 wherein said registration act includes establishing an internet access level for the user, the access level being selected from the group consisting of an unfiltered internet access level, a filtered access level, and a restricted access level, such that the information on whether the user is authorized to access the specific internet sites includes the access level for the specific user.

10. The method of customizing individual internet access in a system as defined in claim 9 wherein said controlling act includes granting the user full access to all internet sites with the unfiltered access level.

11. The method of customizing individual internet access in a system as defined in claim 9 wherein said controlling act includes blocking the user's access to one or more predetermined internet sites with the filtered access level.

12. The method of customizing individual internet access in a system as defined in claim 11 wherein said registration act further includes a system administrator selecting the one or more predetermined internet sites.

13. The method of customizing individual internet access in a system as defined in claim 11 wherein said registration act further includes the user or a representative of the user selecting the one or more predetermined internet sites.

14. The method of customizing individual internet access in a system as defined in claim 11 wherein said registration act further includes a third party selecting the one or more predetermined internet sites.

15. The method of customizing individual internet access in a system as defined in claim 9 wherein said controlling act includes blocking the user's access to any internet sites that is not included in a predetermined set of approved internet sites.

16. The method of customizing individual internet access in a system as defined in claim 15 wherein said registration act further includes a system administrator selecting the one or more predetermined internet sites.

17. The method of customizing individual internet access in a system as defined in claim 15 wherein said registration act further includes the user or a representative of the user selecting the one or more predetermined internet sites.

18. The method of customizing individual internet access in a system as defined in claim 15 wherein said registration act further includes a third party selecting the one or more predetermined internet sites.

19. The method of customizing individual internet access in a system as defined in claim 1 wherein said controlling act includes reviewing the contents of a requested site and blocking the site if it contains selected material.

20. The method of customizing individual internet access in a system as defined in claim 1 wherein said generating act includes storing the information that identifies the user in a read only memory on the personal smart card.

21. The method of customizing individual internet access in a system as defined in claim 1 wherein said generating act includes taking a photograph of the user with a digital camera again, system currently is configured with a digital camera.

22. The method of customizing individual internet access in a system as defined in claim 21 wherein said generating act further includes printing the photograph on said personal smart card.

23. The method of customizing individual internet access in a system as defined in claim 1 wherein said generating act includes printing the personal smart card from a card printer.

24. The method of customizing individual internet access in a system as defined in claim 1 further comprising the act of providing a data display unit at the internet station, the data display unit selected form the group consisting of a telephone, a television, a pager, a computer terminal, and a personal digital assistant.

25. The method of customizing individual internet access in a system as defined in claim 1 wherein said reading act is performed by a card reader.

26. The method of customizing individual internet access in a system as defined in claim 1 further comprising the act of authenticating the personal smart card.

27. The method of customizing individual internet access defined in claim 26 further comprising the act of establishing a secure sockets layer protocol to provide security for data transferred across an internet connection in the authenticating act.

28. The method of customizing individual internet access defined in claim 27 further comprising the act of encrypting the data at said internet station and using hypertext transfer protocol to transfer the data between said internet station and said server.

29. The method of customizing individual internet access in a system as defined in claim 26 wherein said authenticating act includes entering a personal identification number that is associated with the personal smart card.

30. The method of customizing individual internet access in a system as defined in claim 26 wherein said authenticating act includes entering a password that is associated with the personal smart card.

31. The method of customizing individual internet access in a system as defined in claim 26 wherein said authenticating act includes verifying a fingerprint of the user.

32. The method of customizing individual internet access in a system as defined in claim 26 further comprising the act of automatically displaying a predetermined internet site when the personal smart card is removed from the card reader.

33. The method of customizing individual internet access as defined in claim 25 further comprising the act of automatically deleting internet sites viewed by the user at the internet station when the personal smart card is removed from the card reader.

34. The method of customizing individual internet access in a system as defined in claim 1 further comprising the act of authorizing or denying the user to log onto the system based on information stored in the server regarding a maximum amount of time the user may view the internet during a time interval.

35. A system that customizes individual internet access comprising a personal smart card, said personal smart card including:
    a photograph of the user of the system; and
    a read only memory that stores information identifying the user to enable the system to control the user's internet access;
    wherein said personal smart card does not include a microprocessor.

36. The system that customizes individual internet access as defined in claim 35 wherein said read only memory is configured as a storage area selected from the group consisting of an encoded memory chip, a magnetic stripe, a bar code, and machine readable indicia.

37. The system that customizes individual internet access as defined in claim 35 wherein the information that identifies the user is unique to that personal smart card and differentiates it from similar personal smart cards.

38. The system that customizes individual internet access as defined in claim 35 wherein said personal smart card is generally wallet-sized.

39. A system that customizes individual internet access comprising a server, said server including:
    a registration module that registers a user with the system;
    a database that stores information regarding internet sites the user is authorized to access;
    an administration module that executes an active server page when an internet site is requested to be displayed; and
    a deny module that grants or denies a request to display an internet site based on the information stored in said database regarding the internet sites the user is authorized to access.

40. The system that customizes individual internet access comprising a server as defined in claim 32 wherein the internet sites the user is authorized to access are selected by a system administrator.

41. The system that customizes individual internet access comprising a server as defined in claim 39 wherein the internet sites the user is authorized to access are selected by system by the user or a representative of the user.

42. The system that customizes individual internet access comprising a server as defined in claim 39 wherein the internet sites the user is authorized to access are selected by a third party.

43. The system that customizes individual internet access as defined in claim 39 further comprising a third party filter database that stores information regarding a set of internet sites the user is authorized to access.

44. The system that customizes individual internet access as defined in claim 43 wherein the set of internet sites are selected by a third party.

45. A system that customizes individual internet access comprising:
    software adapted to be loaded on a computer that is configured to register a user with the system;
    software adapted to be loaded on a computer that is configured store information regarding internet sites the user is authorized to access;
    software adapted to be loaded on a computer that is configured to execute an active server page when an internet site is requested to be displayed; and
    software adapted to be loaded on a computer that is configured to grant or deny a request to display an internet site based on the information stored in the system regarding the internet sites the user is authorized to access.

46. The system that customizes individual internet access comprising a server as defined in claim 45 wherein the internet sites the user is authorized to access are selected by a system administrator.

47. The system that customizes individual internet access comprising a server as defined in claim 45 wherein the internet sites the user is authorized to access are selected by the user or a representative of the user.

48. The system that customizes individual internet access comprising a server as defined in claim 45 wherein the internet sites the user is authorized to access are selected by a third party.

49. The system that customizes individual internet access comprising a server as defined in claim 45 further comprising software adapted to be loaded on a computer that is configured to store information regarding a pre-selected set of internet sites the user is authorized to access.

50. A system that customizes individual internet access comprising a server as defined in claim 49 wherein the pre-selected set of internet sites is selected by a third party.

51. A method of customizing individual internet access comprising the following acts:
    registration of a user of the system and issuance of a smart card identifying the user by a unique indicia stored in a read only memory on the card;
    determining whether a user is authorized to log onto the system by comparing indicia read off of a card and allegedly correlative information from a user to determine if a correlation exists; and
    controlling the user's access to specific internet sites.

52. The method of customizing individual internet access as defined in claim 51 wherein said registration act includes entering information into the system on whether the user is authorized to access specific internet sites and storing the information in the server.

53. The method of customizing individual internet access as defined in claim 51 wherein said registration act is performed by a registration module.

54. The method of customizing individual internet access as defined in claim 51 wherein said determining act is performed by a registration module.

55. The method of customizing individual internet access as defined in claim 51 wherein said determining act includes accessing whether information stored in the system indicates that the user has exceeded a maximum amount of time the user may view the internet in a time interval.

56. A method of customizing individual internet access as defined in claim 51 wherein said controlling act includes granting or denying a request from an internet station to display an internet site based on information stored in the system on whether the user is authorized to access the internet site.

57. A system that assists in customizing individual internet access comprising a carding station, said carding station including:
   a registration module that enables entry of information about a user into the system to register the user with the system and has a data transfer capability for transfer of entered user information between said carding station and a server;
   a camera that takes a photograph of the user; and
   a card printer that generates a personal smart card not including a microprocessor for the user, the personal smart card including information that identifies the user correlated with the entered user information transferred to a server.

58. The system that customizes individual internet access as defined in claim 57 further comprising:
   an imaging module that processes information related to the photograph and allows the photograph to be altered;
   a printing module that processes information related to said card printer;
   a carding application that process information related to the imaging module and the printing module and transfers the information to the registration module;
   a card reader that reads the information stored on the personal smart card; and
   a carding module that process the information related to said card reader.

59. The system that customizes individual internet access as defined in claim 57 wherein the registration module includes data entry screens that allow entry of the information about the user into the system.

60. A system that customizes individual internet access comprising:
   software adapted to be loaded on a computer that is configured to enable entry of information about a user into the system and transfer information between the carding station and a server to register a user with the system;
   software adapted to be loaded on a computer that is configured to process information related to a photograph taken by a camera; and
   software adapted to be loaded on a computer that is configured to process information related to a card printer that prints a personal smart card for the user, the personal smart card including information that identifies the user to enable the system to control the user's access to specific internet sites and not including a microprocessor.

61. A method of generating a personal smart card for a user of a system that customizes individual internet access, said method comprising the steps of:
   entering information about the user at a data display unit;
   requesting a server to register the user with the system; and
   printing a personal smart card and storing information that identifies the user in a memory on the smart card not including a microprocessor to enable the system to control the user's access to specific internet sites.

62. The method of generating a personal smart card for a user of a system that customizes individual internet access as defined in claim 61 further comprising the steps of:
   taking a photograph of the user with a camera;
   displaying the photograph on a data display unit; and
   cropping the photograph on the data display unit;
   wherein the photograph of the user is printed on said personal smart card.

63. A internet station that customizes individual internet access comprising:
   a card reader that reads a read only memory and not a microprocessor on a personal smart card issued to a user to obtain information that identifies the user to control the user's internet access;
   an authentication module that verifies that the user is using his/her own personal smart card;
   an internet browser that allows the user to browse the internet;
   a shim that communicates with said internet browser and has a port for connection to a server to request permission from the server to display an internet site requested by the user; and
   a WSOCK that communicates with said shim and displays the internet site requested by the user if permission is granted by the server.

64. The system that customizes individual internet access as defined in claim 63 wherein said internet browser is accessed by the user at a data display unit selected from the group consisting of a telephone, a television, a pager, a computer terminal, and a personal digital assistant.

65. The system that customizes individual internet access as defined in claim 63 wherein said internet station has a data entry interface to receive identifying data about a user and the authentication module verifies that the user is using his/her own personal smart card based on entry of a personal identification number entered at the data entry interface that is associated with said personal smart card.

66. The system that customizes individual internet access as defined in claim 63 wherein said internet station has a data entry interface to receive identifying data about a user and the authentication module verifies that the user is using his/her own personal smart card based on entry of a password entered at the data entry interface that is associated with said personal smart card.

67. The system that customizes individual internet access as defined in claim 63 wherein said internet station has a data entry interface to receive identifying data about a user and the authentication module verifies that the user is using his/her own personal smart card based on a fingerprint or other biometric data entered at the data entry interface that is associated with said personal smart card.

68. The system that customizes individual internet access as defined in claim 63 wherein said internet browser includes an internet browser selected from the group consisting of Netscape Navigator® and Microsoft Internet Explorer®.

69. The system that customizes individual internet access defined in claim 63 wherein said internet station further includes a secure sockets layer protocol that provides security for data transferred across an internet connection.

70. The system that customizes individual internet access defined in claim 69 wherein the secure sockets layer protocol includes Microsoft CrptoAPI®.

71. The system that customizes individual internet access defined in claim 69 wherein the secure sockets layer protocol enables said internet station to encrypt the data and use hypertext transfer protocol to transfer the data.

72. A system that customizes individual internet access comprising:
    software that is adapted to be loaded on a computer that is configured to control a card reader that reads a personal smart card issued to a user of the system, the personal smart card including information that identifies the user to control the user's internet access and not including a microprocessor;
    software that is adapted to be loaded on a computer that is configured to authenticate the personal smart card;
    software that is adapted to be loaded on a computer that is configured to create an internet connection; and
    software that is adapted to be loaded on a computer that is configured to communicate with the internet browser and request permission from the system to display an internet site requested by the user; and
    software that is adapted to be loaded on a computer that is configured to display the internet site requested by the user if permission is granted from the system.

73. The system that customizes individual internet access as defined in claim 72 wherein the personal smart card is authenticated by entry of a personal identification number that is associated with the personal smart card.

74. The system that customizes individual internet access as defined in claim 72 wherein the personal smart card is authenticated by entry of a password that is associated with the personal smart card.

75. The system that customizes individual internet access as defined in claim 72 wherein the personal smart card is authenticated by verification of a fingerprint or other biometric data of the user.

76. The system that customizes individual internet access defined in claim 72 further including software configured to establish a secure sockets layer protocol that provides security for data transferred across an internet connection.

77. The system that customizes individual internet access defined in claim 72 wherein the software configured to establish the secure sockets layer protocol includes Microsoft CryptoAPI®.

78. The system that customizes individual internet access defined in claim 72 wherein the software configured to establish the secure sockets layer protocol encrypts the data and uses hypertext transfer protocol to transfer the data.

79. A method of customizing individual internet access in a system comprising:
    reading a memory and not a microprocessor on a personal smart card issued to a user of the system, to obtain information that identifies a user;
    authenticating the personal smart card;
    requesting a server to grant the user access to the system; and
    displaying the internet via an internet browser.

80. The method of customizing individual internet access in a system as defined in claim 79 wherein said reading step is performed by a card reader and associated software.

81. The method of customizing individual internet access in a system as defined in claim 79 wherein said authenticating step is based on entry of a personal identification number that is associated with the personal smart card.

82. The method of customizing individual internet access in a system as defined in claim 79 wherein said authenticating step is based on entry of a password that is associated with the personal smart card.

83. The method of customizing individual internet access in a system as defined in claim 79 wherein said authenticating step is based on verifying biometric data of the user.

84. The method of customizing individual internet access in a system as defined in claim 79 wherein said displaying step includes requesting permission from the server to display a specific internet site.

85. The method of customizing individual internet access in a system as defined in claim 79 further comprising establishing a secure sockets layer protocol to provide security for data transferred across an internet connection.

86. The method of customizing individual internet access defined in claim 85 further comprising encrypting the data and using hypertext transfer protocol to transfer the data.

87. A system that customizes individual internet access comprising:
    a server that registers a user with the system, stores information regarding internet sites the user is authorized to access, and controls the user's access to the internet sites based on the information stored in said server for the specific user;
    a carding station that provides for entry of information about the user to register the user with the server;
    a remote service bureau that generates a personal smart card for the user based on the information about the user stored in the server; and
    an internet station that allows the user to view the internet with the personal smart card, the personal smart including information that identifies the user to enable the server to control the user's access to the internet sites and not including a microprocessor;
    wherein the information about the user stored in the server includes the information regarding internet sites the user is authorized to access.

* * * * *

UNITED STATES PATENT AND TRADEMARK OFFICE
CERTIFICATE OF CORRECTION

PATENT NO. : 6,934,841 B2
DATED : August 23, 2005
INVENTOR(S) : Boyles, Stephen L.

It is certified that error appears in the above-identified patent and that said Letters Patent is hereby corrected as shown below:

Title page,
Item [56], References Cited, U.S. PATENT DOCUMENTS,
delete "5,953,732" and insert -- 5,959,732 --.

Drawings,
Sheet 1, Fig. 1, delete "ITNERNET SITE" and insert -- INTERNET SITE --.

Signed and Sealed this

Tenth Day of January, 2006

JON W. DUDAS
*Director of the United States Patent and Trademark Office*